United States Patent
Rothamel et al.

(10) Patent No.: US 6,826,958 B2
(45) Date of Patent: Dec. 7, 2004

(54) METHOD AND DEVICE FOR INSERTING A ROTOR, IN PARTICULAR A MOTOR VEHICLE WHEEL, WHICH IS ROTATABLY MOUNTED ON AN UNBALANCE MACHINE AND CAN BE DRIVEN BY MEANS OF AN ELECTRIC MOTOR

(75) Inventors: Karl Rothamel, Ober-Ramstadt (DE); Lorenz Lenhardt, Griesheim (DE)

(73) Assignee: Snap-On Equipment GmbH (DE)

( * ) Notice: Subject to any disclaimer, the term of this patent is extended or adjusted under 35 U.S.C. 154(b) by 0 days.

(21) Appl. No.: 10/319,164

(22) Filed: Dec. 12, 2002

(65) Prior Publication Data

US 2003/0115957 A1 Jun. 26, 2003

(30) Foreign Application Priority Data

Dec. 12, 2001 (DE) .......................................... 101 60 955

(51) Int. Cl.[7] .............................................. G01M 1/22
(52) U.S. Cl. ........................................................ 73/462
(58) Field of Search ........................ 73/460, 462, 475, 73/487; 318/269–272

(56) References Cited

U.S. PATENT DOCUMENTS

| | | | | |
|---|---|---|---|---|
| 4,161,680 A | * | 7/1979 | Akamatsu ................... 318/722 |
| 4,229,682 A | * | 10/1980 | Goddijn ...................... 318/254 |
| 5,060,513 A | * | 10/1991 | Rothamel ..................... 73/460 |
| 5,469,040 A | * | 11/1995 | Rothamel ..................... 318/785 |
| 5,847,277 A | * | 12/1998 | Rothamel et al. ............. 73/462 |
| 5,909,097 A | * | 6/1999 | Rothamel et al. ........... 318/561 |

FOREIGN PATENT DOCUMENTS

| | | |
|---|---|---|
| DE | 19636268 | 3/1998 |
| DE | 19844975 | 3/2000 |
| DE | 10000235 | 7/2001 |

* cited by examiner

*Primary Examiner*—Helen Kwok
(74) *Attorney, Agent, or Firm*—Ostrolenk, Faber, Gerb & Soffen, LLP

(57) ABSTRACT

A method and a device for moving a wheel rotatably mounted on a wheel balancing machine from a first position at which unbalance compensation has been performed, to a second unbalance compensation position for further unbalance compensation. According to the method, the rotor is externally driven, e.g., by hand, to freely running rotation, at which time, a drive motor is energized to generate a torque which acts counter to the direction of rotation of the wheel and to bring the wheel to a stop over a braking distance brought about by the counter torque which corresponds to the angle of rotation which is traveled over up to the unbalance compensation position, whereupon, the motor is de-energized. The apparatus includes a motor drive including an alternating voltage controller having a longitudinal switching device; and a commutation switching device, the switching devices each including two semiconductor switches which are connected in an anti-serial configuration.

14 Claims, 1 Drawing Sheet

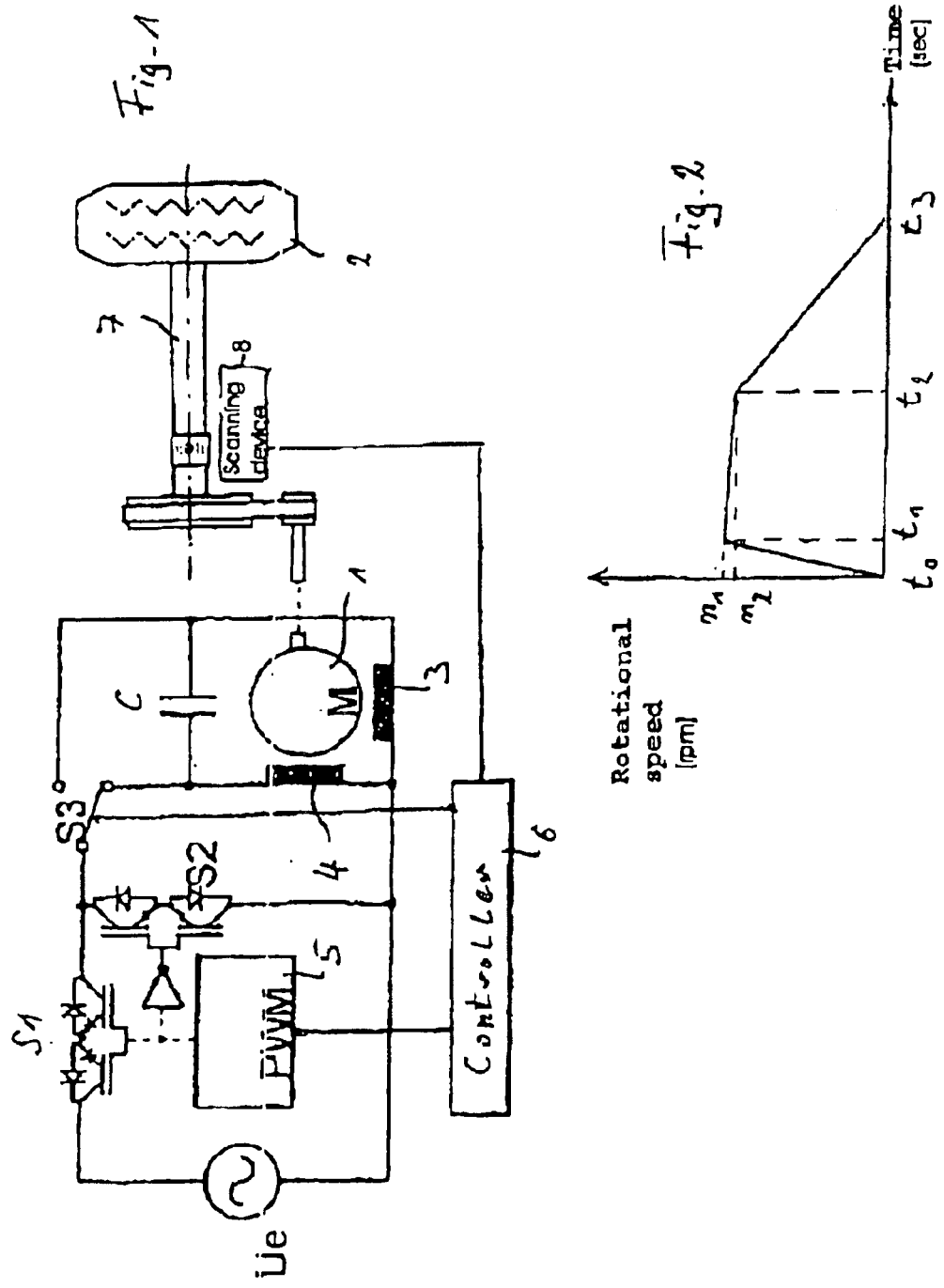

METHOD AND DEVICE FOR INSERTING A ROTOR, IN PARTICULAR A MOTOR VEHICLE WHEEL, WHICH IS ROTATABLY MOUNTED ON AN UNBALANCE MACHINE AND CAN BE DRIVEN BY MEANS OF AN ELECTRIC MOTOR

CROSS-REFERENCE TO RELEATED APPLICATION

This application claims priority of German application number 101 60 955.8 filed Dec. 12, 2001.

BACKGROUND OF THE INVENTION

1. Field of the Invention

The invention relates to a wheel balancing method and apparatus, and more particularly to a method for positioning a rotor, in particular a motor vehicle wheel, which is rotatably mounted on an wheel balancing machine and can be driven by means of an electric motor, as a desired position for unbalance compensation.

2. Related Art

In such a method which is known from DE 196 36 268 C2, the rotor is driven again after the unbalance compensation has been carried out in a first compensation plane, and after the drive has been switched off said rotor is braked in such a way that the resulting braking distance corresponds to the remaining difference angle up to the second unbalance compensation position. The braking of the rotor can be brought about by reversing the torque of the electric motor which is used to drive the main shaft of the unbalance machine.

DE 100 00 235 A1 discloses an unbalance machine whose main shaft is connected to a single-phase alternating current motor, two stator windings being provided which are supplied with current with a phase difference of 90°. The phase difference of the power supply is brought about by means of at least one capacitor which can be connected in series with one of the two stator windings depending on the direction of rotation.

BRIEF DESCRIPTION OF THE INVENTION

The object of the invention is to provide a wheel balancing method and apparatus with which a rotor can easily be moved from a stopped position, in particular, an unbalance compensation position, as which unbalance compensation has already been carried out, into second position at which a subsequent unbalance compensation can be carried out.

According to the invention, this object is achieved by a method in which the rotor is driven to the second unbalance compensation position, with the electric motor switched off, into a freely running rotation by an externally acting force which is, for example, applied manually, in particular by an operator. During this freely running rotation, the electric motor is switched on in order to generate a counter torque which acts counter to the direction of rotation of the rotor. The switching on takes place in such a way that the braking distance which is brought about by the counter torque corresponds to the angle of rotation which is traveled over to the unbalance compensation position. The electric motor is switched off in the compensation position.

The angle of rotation at which the counter torque is switched on is determined from the braking effect which was detected when the rotor was braked into the previous stop position, in particular the unbalance compensation position, and the instantaneous rotational speed (respective actual rotational speed) is determined during the freely running out rotation of the rotor.

While the main shaft of the balancing machine is driven in order to drive the rotor, the alternating current motor is to be adjusted to the measuring rotational speed which is suitable for the unbalance measurement, supplied with current under the control of an alternating voltage controller. The stator windings of the alternating current motor are supplied with alternating current here by the acceleration to the measuring rotational speed and during the braking of the motor at which a torque is generated. The alternating voltage controller, in which both the longitudinal switch and the commutation switch are formed from two semiconductor switches which are connected in an anti-serial configuration, is provided for this purpose. Suitable semiconductor switches are power switches, in particular IGBTs or MOSFETs. The alternating current motor is preferably embodied as a single-phase alternating current motor which has two stator windings which are supplied with current with a phase difference of, in particular, 90°.

The semiconductor switches of the alternating voltage controller are switched on and off under the control of a pulse width modulation (PWM). By means of the pulse duty factor and the clock frequency of the pulse width modulation it is possible not only to control the acceleration of the rotor to the measuring rotational speed but also to set the braking effect, when the torque is generated, in such a way that the rotor is stopped, in particular in the respective compensation position. This also applies to the case in which, after the compensation process in a first compensation position, the rotor is selectively moved into a second compensation position, the rotor being made to rotate in a freely running out fashion by means of a force which is applied from the outside by an operator, in particular manually, and the controlled braking operation is switched on.

As a result of the braking using a counter torque which is generated by alternating current, a significantly higher braking effect is obtained than when direct current is supplied to the motor when the rotor is braked.

For this reason, with the invention the effect of a position brake with which the rotor is stopped in the respectively desired position, in particular compensation angle of rotation position, is obtained without additional installations.

BRIEF DESCRIPTION OF THE DRAWINGS

The invention will be explained in more detail with reference to the figures, of which:

FIG. 1 shows an exemplary embodiment of the invention in a block circuit representation; and FIG. 2 shows a diagram explaining the method of operation of the exemplary embodiment illustrated in FIG. 1.

DETAILED DESCRIPTION OF AN EXEMPLARY EMBODIMENT OF THE INVENTION

With reference to FIG. 1, a main shaft 7 of an balancing machine which can be driven by an electric motor 1 via a gear mechanism, for example belt drive, is illustrated. The electric motor is embodied as an alternating current motor, in particular a single-phase alternating current motor, such as is known, for example, from DE 100 00 235 A1 in a wheel balancing machine. A rotor 2, for example, a motor vehicle wheel, is clamped onto the main shaft 7 of the balancing machine in a known fashion.

In order to measure unbalance, the main shaft 7 and the rotor 2 are driven by the electric motor 1 so as to accelerate to the measuring rotational speed. During the measuring run, forces resulting on the main shaft 2 from the unbalance of the rotor are measured and converted into unbalance compensation variables with respect to compensation planes on the rotor 2. A suitable measuring arrangement is known, for example, from DE 198 44 975 A1.

In order to supply power in a controlled fashion during the acceleration, the balancing machine has an alternating voltage controller with a longitudinal switch S1 and a commutation switch S2 via which stator windings 3, 4 of the electric motor 1 are supplied with power. The direction of rotation of the electric motor 1 is set using a changeover switch S3 which is preferably embodied as a relay. In the switching position of the changeover switch S3 which is illustrated in FIG. 1, the forward direction of rotation, in which the rotor is adjusted to the measuring rotational speed, is illustrated by way of example.

A capacitor C, which is connected in series with the stator winding 4 in FIG. 1, ensures that the two stator windings 3, 4 are supplied with the motor current with a phase difference of, in particular, 90°. The motor current is supplied by an alternating voltage source Ue. Instead of a capacitor, two or more capacitors can be used to change the capacitance, said capacitors being switched into the motor circuit, or disconnected from it, as a function of the rotational speed, as described, for example, in DE 100 00 235 A1.

Both the longitudinal switch S1 and the commutation switch S2 are comprised of two semiconductor switches which are connected in an anti-serial configuration. These semiconductor switches are preferably embodied as IGBTs. However, it is also possible to use MOSFETs. The power semiconductor switches have an integrated antiparallel diode so that this diode conducts current when there is a negative polarity across the respective semiconductor switch and an electrical voltage cannot occur. As the semiconductor switches have to block alternating voltage or conduct alternating current when the alternating voltage controller is operating, but the semiconductor switches only block or connect through voltage of one polarity, in each case two semiconductor switches are provided in an antiserial circuit both for the longitudinal switch S1 and for the commutation switch S2.

In the switched position of the changeover switch S3 illustrated in FIG. 1, the alternating voltage of the alternating voltage source Ue, for example the power system voltage, is conducted from the longitudinal switch S1 to the electric motor 1. The commutation switch S2 is actuated by the pulse width modulation (PWM) 5 in such a way that it accepts the current of the motor inductor as long as the longitudinal switch S1 is switched off (synchronous commutation). For this purpose, the two gates of the semiconductor switches forming the longitudinal switches S1, for example, the two IGBTs are actuated in push-pull operation with respect to the two gates of the semiconductor switches forming the commutation switch S2. This ensures that the control voltages applied to the gates of the longitudinal S1 and of the commutation switch S2 by the pulse width modulation 5 are not simultaneous but rather are supplied alternately or in antiphase. The strength of the motor current which is supplied to the stator windings 3, 4 is determined by means of the pulse duty factor of the PWM signal. The clock frequency of the PWM signal is preferably modulated with an order of magnitude between 3 to 10 kHz.

In order to stop the rotor in a specific position, for example a compensation angle of rotation position after the measuring run, a counter torque is generated by the electric motor 1. For this purpose, the changeover switch S3 is moved into a corresponding switch position, for example the upper position in FIG. 1, as a function of the respective direction of rotation of the rotor 2. In this switched position, the capacitor C is connected in series with the stator winding 4. In this motor braking mode, the switch S2 acts as a longitudinal switch and the switch S1 as a commutation switch. As during acceleration, the stator windings 3, 4 are supplied with alternating current via the alternating voltage controller. In the process, a counter torque with which the rotation of the rotor 2 and of the main shaft 7 is braked is generated. The braking can take place under the control of the operation of the pulse width modulation 5 in such a way that the rotor 2 is stopped in the desired compensation angle of rotation position. In addition, it is possible to time the switching over of the switch S3 into the motor braking mode in such a way that, given a known braking effect which is brought about by the torque generated by the electric motor 1, the rotor 2 is stopped in the compensation angle of rotation position as a function of the instantaneous rotation of speed.

In order to control the changeover switch S3 and the pulse width modulation 5 it is possible to provide a control device 6 which is connected to a scanning device 8 which scans the respective angle of rotation position of the main shaft 7, and thus of the rotor 2, and/or the rotational speed of the rotor 2 and of the main shaft 7 as well as the direction of rotation.

When the rotor 2 is inserted from an unbalance compensation angle of rotation position, in which unbalance compensation has already taken place in a specific compensation plane, into a further, for example second, unbalance angle of rotation compensation position in the same, or in a different, compensation plane, the rotor is not driven by the electric motor 1 but instead is driven by means of a force which acts from the outside and is provided by a maintenance person, the rotor being, for example, manually rotated by the maintenance person. The changeover switch S3 is moved, as a function of the direction of rotation of the rotor 2, into, for example, the upper position, i.e. into the braking position which is dependent on the direction of rotation, before or at the same time as the start of the rotation of the rotor 2, if appropriate, under the control of the control device 6. In addition, the alternating voltage controller which is comprised of the two switches S1 and S2 is switched on, also preferably under the control of the control device 6, and the alternating voltage which is set by the alternating voltage source Ue or an alternating voltage which is set by the pulse width modulation 5 is applied to the stator windings 3, 4.

As a result, a counter torque which is opposed to the direction of rotation of the rotor 2 and of the main shaft 8 is generated by the electric motor 1. The direction of rotation can be sensed by the scanning device 8 and as a function thereof the switch S3 can be moved into the corresponding position in which the counter torque is generated in the opposite direction to the direction of rotation of the rotor 2.

As is apparent from FIG. 2, at the time t0 the rotor 2 is moved from a stop position, for example the first compensation position, by a force which acts from the outside, said rotor 2 being in particular rotated manually, and the rotor assumes a specific rotational speed n1 as a function of the acting force, and coasts to a standstill from a time t1. In the course of the running out rotation of the rotor 2, the alternating voltage controller is switched on at a time t2 after the changeover switch S3 has been moved into the correct switched position, and the alternating voltage which generates the counter torque is applied to the stator windings 3, 4 of the electric motor 1. This counter torque brings about braking which stops the rotor 2 in the desired second compensation position at the time t3. The electric motor 1 is then switched off.

The braking profile from the time t2 up to the time t3 can be controlled by the pulse width modulation 5 in such a way that the rotor 2 and the main shaft 7 are stopped at the time t3. It is however also possible to position the time t2 in such a way that the braking operation terminated in the second compensation position as a function of the known braking effect with which the counter torque generated by the electric motor 1 acts on the rotor 2, and as a function of the rotational speed n2 at the time t2.

As the direction of rotation of the main shaft 7 and of the rotor 2 can be detected by means of the scanning device 8, the direction of rotation for the insertion of the rotor from the previous compensation position, for example the first compensation position, into the following compensation position, for example the second compensation position, is detected, with the result that the changeover switch S3 is moved, as a function of said direction, into the corresponding switched position in which the torque generated by the motor 1 acts as a counter torque opposed to the direction of rotation of the main shaft 7 and of the rotor 2.

What is claimed is:

1. A method for positioning inserting a rotor which is rotatably mounted on a balancing machine including an alternating current motor, from a first stopped position to a second unbalanced compensation position for compensating unbalance, the method comprising the steps of:

driving the rotor, with the alternating current motor switched off, to a freely running rotation by an externally applied force;

energizing the alternating current motor at a predetermined time to generate a torque which acts counter to the direction of rotation of the rotor and which brings the rotor to a stop in a braking distance at the second position which corresponds to the angle of rotation required for unbalance compensation; and de-energizing the alternating current motor when the rotor is at the second compensation position.

2. The method as claimed in claim 1, wherein the angle of rotation which corresponds to the braking distance is determined from a braking effect which was measured when the rotor was braked to the first stopped position, and the an instantaneous rotational speed during the freely running rotation.

3. The method as claimed in claim 2, wherein the alternating current motor is energized during the freely running rotation of the rotor.

4. The method as claimed in claim 3, wherein the rotor is driven manually to the freely running rotational speed.

5. The method as claimed in claim 1, wherein the alternating current motor is energized during the freely running rotation of the rotor.

6. The method as claimed in claim 1, wherein the alternating current motor is energized by an alternating voltage motor controller.

7. The method as claimed in claim 1, wherein the first stopped position is a first unbalance compensation position, in which unbalance compensation was carried out on the rotor, and the second position is a further unbalance compensation position.

8. A wheel balancing apparatus comprising:

a rotatable support for a wheel to be balanced;

a single-phase alternating current motor operable to rotate the support; and a motor drive for the motor, the motor drive including an alternating voltage controller comprised of:
        a longitudinal switching device; and
        a commutation switching device,
        the longitudinal switching device and the commutation switching device each including two semiconductor switches which are connected in an anti-serial configuration.

9. The wheel balancing apparatus as claimed in claim 8, wherein the motor includes two stator windings and at least one capacitor connectable in series with one of the two stator windings according to the direction of rotation of the motor, to provide a phase difference between the power supplied to the two windings.

10. The wheel balancing apparatus as claimed in claim 9, wherein the phase difference is 90 degrees.

11. The wheel balancing apparatus as claimed in claim 9, further including a switch operable to connect the capacitor in series with a selected one of the two stator windings.

12. The wheel balancing apparatus as claimed in claim 9, further including a switch operable to connect the capacitor in series with a selected one of the two stator windings.

13. The wheel balancing apparatus as claimed in claim 8, wherein the motor includes two stator windings which are supplied with power, phase-shifted by 90°.

14. The wheel balancing apparatus as claimed in claim 8, wherein the semiconductor switches are MOSFETs or IGBTs.

* * * * *